E. T. McPHERSON.
CUTTING DEVICE.
APPLICATION FILED MAY 24, 1916.

1,193,578.

Patented Aug. 8, 1916.

Inventor
Elmer T. McPherson,

Attorneys

UNITED STATES PATENT OFFICE.

ELMER T. McPHERSON, OF WILMINGTON, OHIO, ASSIGNOR TO THE IRWIN AUGER BIT COMPANY, OF WILMINGTON, OHIO, A CORPORATION OF OHIO.

CUTTING DEVICE.

1,193,578.  Specification of Letters Patent.  Patented Aug. 8, 1916.

Original application filed December 23, 1915, Serial No. 68,307. Divided and this application filed May 24, 1916. Serial No. 99,692.

*To all whom it may concern:*

Be it known that I, ELMER T. MCPHERSON, a citizen of the United States, residing at Wilmington, in the county of Clinton and State of Ohio, have invented certain new and useful Improvements in Cutting Devices, of which the following is a specification, reference being had therein to the accompanying drawing.

This invention relates to a cutting device. In a copending application filed by me December 23rd, 1915, Ser. No. 68,307, of which the present application is a division, this embodiment of the invention was fully shown and described. Only so much, however, of the subject matter of that application will be here illustrated and described as is necessary for a full disclosure of the embodiment and application of this invention.

The object of the invention is to provide a cutting device which is applicable to dies and is especially adapted to sever the shanks of boring tools from the rough stock in such a manner as to insure a clean and accurate cut.

Figure 1:
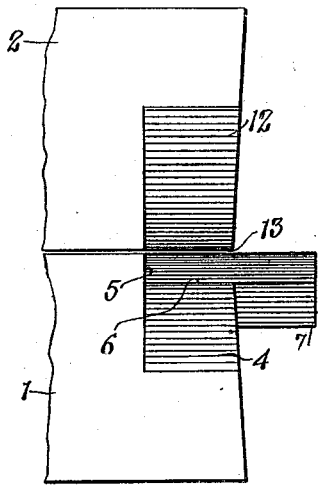
Figure 2:
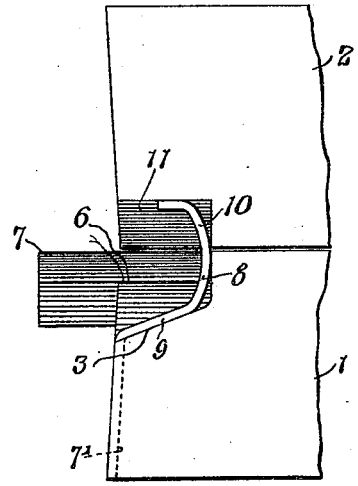
Figure 3:
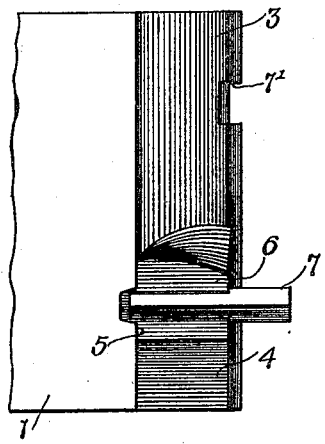
Figure 4:
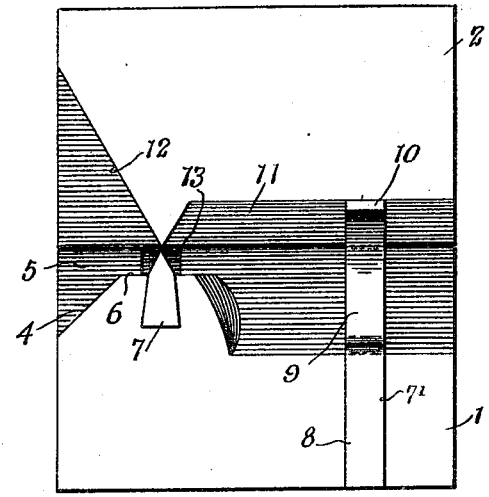
Figure 5:
Figure 6:

In the accompanying drawings, Figure 1 is a front elevation of the portion of the dies provided with a cutting device; Fig. 2 is a rear elevation of the same; Fig. 3 is a top plan view of that portion of the lower or anvil die containing the cutting device; Fig. 4 is a side elevation showing the knife edges; Fig. 5 shows the finished shank with the unused stock unsevered; and Fig. 6 shows the shank after the stock is severed therefrom.

In the embodiment of the invention here illustrated I have provided a lower or anvil die 1 and an upper or hammer die 2. These dies, as was set forth in the copending application above mentioned, are adapted to form and finish the shanks of boring tools and to notch the same preparatory to severing, as is clearly shown in Fig. 5. The features of the dies for so forming the shanks are not herein shown, as reference may be had to said copending application, and it is to be understood, however, that the cutting device is adaptable for other uses.

The die 1 at one side has been cut away to form an inclined bevel, as shown at 3. The die has also been cut away at 4 and the horizontal portion has been cut away, as shown at 5, the cutting away of these three portions leaving a ledge 6. This ledge has a slot therein in which is located a knife 7 whose upper edge is in line with the upper edge of the die 1. At one side of this knife the vertical portion of the side of the die 1 has therein a groove 7'. Within this groove is removably located a hook 8 extending vertically and bent back, as shown at 9, the portion 9 lying flat against the inclined portion 3. The hook 8 extends above the plane of the lower die, as shown at 10, and curves outwardly forming a stop. The upper die, as shown at 11, has a portion cut away forming a recess, the upper portion of the hook fitting within this recess. A bevel surface 12 coöperates with the side of the recess to form a knife edge 13 coöperating with the knife edge 7 to form a cutter.

When it is desired to sever the formed shank from the unused stock the article shown in Fig. 5 is placed upon the knife edge 7 at the reduced or notched portion thereof, the shank extending over the knife edge to the right, as shown in Fig. 4, with the end thereof extending under the hook. The other end of the shank comprising the unused stock being held in the hand, the first-mentioned end of the shank is forced up against the under side of the hook by pressing downward on the unused stock. By this arrangement the axis of the shank and the unused stock attached thereto will be parallel with the face of the die, the relative positions of the lower knife edge and the under side of the hook being such as to allow this. It will thus be seen that the article will be held securely upon the knife edge of the lower die, the hook insuring the proper position of the shank thereon and preventing upward rotation. When the knife edge of the upper die descends the shank will be severed from the surplus stock and will fall into a basket or other receptacle at the side of the die.

While I have shown and described one embodiment of my invention it will be understood that this has been chosen for the purposes of illustration only and that except as required by the state of the art I do not desire to be limited to the details of construction shown and described.

Having thus fully described my invention what I claim as new and desire to secure by Letters Patent, is:—

1. The combination, with coöperating cutting devices, one of which is fixed constituting a fulcrum for the articles to be severed and the other of which is movable, of a fixed device spaced longitudinally from said fulcrum and provided with an exposed surface constituting a stop on the side opposed to said fulcrum, whereby when the article is rotated around the fulcrum as an axis a portion thereof will engage the stop, limiting the rotation and holding the same firmly in position.

2. The combination, with coöperating cutting devices, one of which is movable and the other of which acts as a fixed fulcrum for the article to be severed, of a fixed stop mounted to one side of said fulcrum, spaced therefrom and on a side toward said movable device, whereby when one end of the article is moved it will rotate around the fulcrum as an axis and engage the stop to hold it firmly in position.

3. In a cutting device, a lower die and an upper die provided with cutting edges, and means to hold one end of the article to be severed during the cutting operation, said means comprising a hook mounted on the lower die extending vertically above the plane of said lower die into a recess in the lower portion of said upper die.

4. In a cutting device adaptable for severing the shanks of boring tools from the unused stock, a pair of dies provided with cutting edges in alinement with their adjacent faces, the lower of said dies being provided with a hook mounted thereon at one side of its cutting edge, the upper of said dies being provided with a recess at its lower side adjacent its knife edge, said hook curving upwardly into said recess and above the knife edge of the lower die.

5. In a cutting device, a lower die provided with a knife edge and a bevel portion, a vertically extending groove below said bevel portion, a hook provided with a vertically extending portion mounted within said groove and bent back upon said bevel portion, an upper die provided with a knife edge coöperating with said first-mentioned knife edge, and a recess at its lower side, said hook extending upwardly into said recess and above the lower knife edge.

6. In a cutting device adaptable for severing the shanks of boring tools from the unfinished stock, a fixed knife edge, a hook mounted to one side of said knife edge and extending above the same, whereby one end of the article to be severed can be pressed downwardly so that the opposite end thereof will engage the under side of the hook, the knife edge acting as a fulcrum, and a movable knife edge adapted to sever said article when so positioned.

7. The combination, with a fixed die and a movable die provided with cutting devices at one side thereof, of a fixed hook provided with a shank mounted on the fixed die, and a hook portion extending toward the movable die and inwardly with its end bent outwardly forming a stop.

8. The combination, with a fixed die having a beveled portion and a movable die, said dies being provided with coöperating cutting devices, of a hook mounted on said fixed die adjacent said beveled portion and extending beyond the plane of said fixed die toward said movable die.

In testimony whereof, I affix my signature.

ELMER T. McPHERSON.

Copies of this patent may be obtained for five cents each, by addressing the "Commissioner of Patents, Washington, D. C."